(12) United States Patent
Schoor

(10) Patent No.: US 10,033,098 B2
(45) Date of Patent: Jul. 24, 2018

(54) RADAR DEVICE AND METHOD HAVING AN ANTENNA ARRAY WITH TWO SWITCHING STATES OF DIFFERENT MODULATION

(71) Applicant: Robert Bosch GmbH, Stuttgart (DE)

(72) Inventor: Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 339 days.

(21) Appl. No.: 14/782,219

(22) PCT Filed: Feb. 14, 2014

(86) PCT No.: PCT/EP2014/052907
§ 371 (c)(1),
(2) Date: Oct. 2, 2015

(87) PCT Pub. No.: WO2014/161687
PCT Pub. Date: Oct. 9, 2014

(65) Prior Publication Data
US 2016/0036124 A1    Feb. 4, 2016

(30) Foreign Application Priority Data

Apr. 3, 2013   (DE) .................. 10 2013 205 892

(51) Int. Cl.
*G01S 13/34*   (2006.01)
*H01Q 3/24*    (2006.01)
(Continued)

(52) U.S. Cl.
CPC .............. *H01Q 3/24* (2013.01); *G01S 7/35* (2013.01); *G01S 13/345* (2013.01);
(Continued)

(58) Field of Classification Search
CPC . G01S 7/35; G01S 7/352; G01S 13/34; G01S 13/343; G01S 13/345; G01S 13/931; H01Q 3/24; H01Q 21/22; H01Q 25/002
(Continued)

(56) References Cited

U.S. PATENT DOCUMENTS 3,836,966 A * 9/1974 Frisbee, Jr. ........... F41G 7/2246
   342/120
3,949,396 A * 4/1976 Cantrell ................. G01S 13/87
   342/158
(Continued)

FOREIGN PATENT DOCUMENTS

CN    1712985 A    12/2005
CN    1721874 A    1/2006
(Continued)

*Primary Examiner* — Peter M Bythrow
(74) *Attorney, Agent, or Firm* — Norton Rose Fulbright US LLP; Gerard Messina

(57) ABSTRACT

A modulation concept for a radar having switched antennas, in which individual switching states of the antenna array having the switched antennas are closely dovetailed with the modulation of the radar signals. In this way it is possible to use switched antennas in the time division multiplex method and thus to allow for short time periods between the switching states. This also allows for a phase evaluation across the switching states.

17 Claims, 2 Drawing Sheets

(51) Int. Cl.
*G01S 13/42* (2006.01)
*G01S 13/93* (2006.01)
*H01Q 21/22* (2006.01)
*H01Q 25/00* (2006.01)
*G01S 7/35* (2006.01)

(52) U.S. Cl.
CPC .......... *G01S 13/422* (2013.01); *G01S 13/931* (2013.01); *H01Q 21/22* (2013.01); *H01Q 25/002* (2013.01); *G01S 13/343* (2013.01)

(58) Field of Classification Search
USPC ...................................... 342/70–72
See application file for complete search history.

(56) References Cited

U.S. PATENT DOCUMENTS

| | | | | |
|---|---|---|---|---|
| 4,319,242 A * | 3/1982 | Lewis | ................ | G01S 13/87 342/59 |
| 5,345,470 A * | 9/1994 | Alexander | .............. | G01S 7/023 342/101 |
| 5,963,163 A * | 10/1999 | Kemkemian | ........... | G01S 13/34 342/109 |
| 6,492,938 B1 * | 12/2002 | Alland | ................... | G01S 7/354 342/118 |
| 6,750,810 B2 * | 6/2004 | Shinoda | .............. | G01S 13/4463 342/149 |
| 6,864,832 B2 * | 3/2005 | Mende | ................... | G01S 13/34 342/109 |
| 7,081,847 B2 * | 7/2006 | Ziller | ................... | G01S 7/034 342/154 |
| 7,268,722 B2 * | 9/2007 | Gottwald | ............. | G01S 13/878 342/107 |
| 7,508,337 B2 * | 3/2009 | Morinaga | ............... | G01S 7/352 342/109 |
| 7,786,926 B2 * | 8/2010 | Hilsebecher | ........ | B60R 21/0134 342/104 |
| 7,786,927 B2 * | 8/2010 | Kondoh | .................. | G01S 7/35 342/109 |
| 7,973,700 B2 * | 7/2011 | Gohl | ....................... | H01Q 3/24 342/118 |
| 8,031,106 B2 * | 10/2011 | Szajnowski | ............... | G01S 7/35 342/109 |
| 8,077,076 B2 * | 12/2011 | Walter | .................. | G01S 13/345 342/118 |
| 8,125,373 B2 * | 2/2012 | Lee | ......................... | G01S 13/34 342/118 |
| 8,390,506 B2 * | 3/2013 | Focke | .................. | G01S 13/345 342/112 |
| 8,717,224 B2 * | 5/2014 | Jeong | ................. | G01S 13/4463 342/70 |
| 8,902,103 B2 * | 12/2014 | Kim | ...................... | G01S 13/345 342/118 |
| 9,024,809 B2 * | 5/2015 | Testar | ...................... | G01S 7/35 342/109 |
| 2003/0052813 A1 * | 3/2003 | Natsume | ................ | G01S 7/354 342/70 |
| 2008/0150790 A1 * | 6/2008 | Voigtlaender | ......... | G01S 13/345 342/127 |
| 2008/0186223 A1 * | 8/2008 | Mayer | .................... | G01S 7/032 342/109 |
| 2009/0315761 A1 * | 12/2009 | Walter | .................. | G01S 13/345 342/200 |
| 2011/0122014 A1 * | 5/2011 | Szajnowski | ............. | G01S 7/023 342/109 |

FOREIGN PATENT DOCUMENTS

| | | |
|---|---|---|
| CN | 1985187 A | 6/2007 |
| CN | 102414574 A | 4/2012 |
| DE | 10 2007 056910 | 5/2009 |
| DE | 10 2009 029 503 | 3/2011 |
| JP | H08136647 A | 5/1996 |
| JP | H08136657 A | 5/1996 |
| JP | 2001085452 A | 3/2001 |
| JP | 2003315448 A | 11/2003 |
| JP | 2004245602 A | 9/2004 |
| JP | 2009541724 A | 11/2009 |
| JP | 2014215044 A | 11/2014 |
| WO | WO 2012/041652 | 4/2012 |

* cited by examiner

RADAR DEVICE AND METHOD HAVING AN ANTENNA ARRAY WITH TWO SWITCHING STATES OF DIFFERENT MODULATION

FIELD OF THE INVENTION

The present invention relates to a radar device having a switched antenna array as well as to a method for the operation of a radar device having a switched antenna array.

BACKGROUND INFORMATION

Modern vehicles are increasingly equipped with driver assistance systems. These driver assistance systems support a vehicle driver in flowing traffic or when parking the vehicle at the edge of the road, for example. For the determination of target parameters such as distance and relative speed of an object, radar systems have proven useful which work with modulated signals. By a suitable selection of the modulation method, an accurate estimation of the target parameters and also the separation of individual targets are possible on the basis of these parameters.

For the angular estimation of the target parameters various types of antenna are used. Besides classical systems scanning in parallel, switched antenna concepts are also increasingly of interest for this purpose. For instance, German document DE 10 2009 029 503 A1 discusses a radar sensor device having a planar antenna device which has a plurality of vertically aligned antenna gaps in the form of a thinned-out array.

For the operation of switched antennas, the time division multiplex method is suitable, for example, in which the switched antennas are used one after the other. In this context, however, a possible movement of the target objects must also be taken into account.

There is therefore a need for a radar device having a switched antenna array, which permits short time intervals between the individual switching states. There is further a need for a radar device which enables a phase evaluation over the various switching states of a utilized antenna array.

SUMMARY OF THE INVENTION

The present invention, according to one aspect, creates a radar device having a switched antenna array, which is configured, in a first switching state, to receive a first radar echo, and, in a second switching state, to receive a second radar echo, the first radar echo being based on an emitted radar signal having a first modulation, and the second radar echo being based on an emitted radar signal having a second modulation.

According to an additional aspect, the present invention creates a method for operating a radar device having a switched antenna array, having the steps of setting a first switching state in the switched antenna array, emitting a first radar signal having a first modulation, receiving a first radar echo in a first switching state of the antenna array, setting a second switching state in the switched antenna array; emitting a second radar signal having a second modulation and receiving a second radar echo in a second switching state of the antenna array.

An aspect of the present invention is to dovetail the individual switching states of an antenna array in a radar device and their switching over with the modulation of the utilized radar signals. The individual switching states of an antenna array in a radar device are thus each linked closely with individually modulated signals.

Because of the linking of different modulations of the radar signals with different switching states of an antenna array, it is possible to use a switched antenna array in the time division multiplex method, and thereby to allow for short periods of time between the individual switching states. Thus, this also makes possible a phase evaluation across the switching states.

An additional advantage is that the use of differently modulated signals allows for the distance estimation and the relative speed estimation to be unambiguous. In addition, an improved angular estimation may be achieved by the switching over of the antennas.

According to one specific embodiment of the present invention, the antenna characteristics of the switched antenna array in the first switching state are different from the antenna characteristics of the switched antenna arrays in the second switching state. Because of the variation of the antenna characteristics in the individual switching states, the angular resolution of the radar device may be further improved.

In a further specific embodiment, the radar device includes a transmitting antenna which is configured to emit the first radar signal and the second radar signal.

According to a special specific embodiment, the transmitting antenna is a switched antenna array. The use of a switched antenna array as transmitting antenna allows for different antenna configurations also for sending out the radar signals. Consequently, the resolution of the radar device is able to be additionally improved.

In a further specific embodiment, the first radar signal and the second radar signal are sent out alternatingly over a predetermined time period. The continuous emission of the two different radar signals over a time period allows for a reliable estimation of the distance and the relative speed of the objects in the visual range of the radar device.

According to one special specific embodiment, the first radar signal and the second radar signal are FMCW-modulated radar signals. Such FMCW (frequency modulated continuous wave) modulated radar signals have proven most useful for a determination of distance and relative speed.

The present invention further includes a motor vehicle having a radar device according to the present invention.

Additional features and advantages of specific embodiments of the present invention result from the following description with reference to the appended drawings.

The drawings shown in the figures are in part perspective representations of elements which, for the sake of clarity, are not necessarily illustrated to scale. The same reference symbols generally designate similar or similarly acting components.

DETAILED DESCRIPTION

Figure 1:
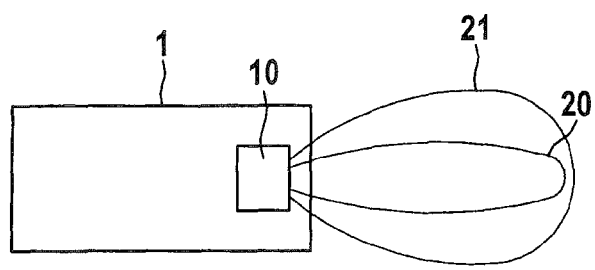
FIG. 1 shows a schematic representation of a motor vehicle having a radar device according to a specific embodiment of the present invention.

FIG. 1 shows a motor vehicle 1 having a radar device 10 according to a specific embodiment of the present invention.

Radar device 10 includes an antenna array, which may be a switched antenna array. Depending on the switching state of the antenna array, different directional characteristics 20, 21 are obtained. Thus, the antenna array may be operated, on the one hand, with a relatively large synthetic aperture, for a good angular resolution. On the other hand, switching states are also possible in which, for example, the unambiguity of the resolution may be raised.

Similarly, it is also possible to operate radar device 1 using transmitting antennas of the same directional characteristic, but having different phase centers. Because of the different phase centers, a directionally dependent phase response is obtained in this case. This directionally dependent phase response may also be utilized for further processing in radar device 10.

Figure 2:
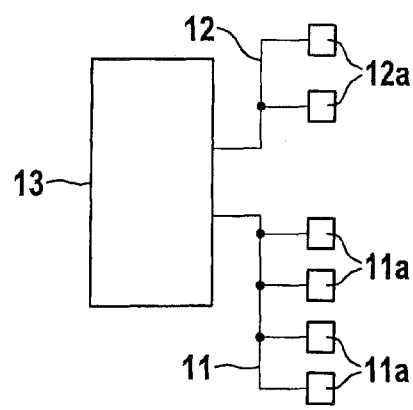
FIG. 2 shows a schematic representation of a radar device having a switched antenna array according to a specific embodiment of the present invention.

FIG. 2 shows a schematic representation of a radar device according to a specific embodiment of the present invention. The radar device includes a control device 13. This control device 13 generates the transmitted signals which are emitted via transmitting antenna 12. In this context, transmitting antenna 12 may be made up either of a single antenna element or, as shown here, of an antenna array having a plurality of antenna elements 12a. Provided transmitting antenna 12 is made up of an antenna array having a plurality of elements 12a, a plurality of different switching states are also possible for transmitting antenna 12. In this way, the antenna characteristic of transmitting antenna 12 may also be adapted.

After control device 13 has generated a transmitted signal and this has been sent via transmitting antenna 12, this signal is reflected by one or more objects. The reflected portions of the transmitted signal are then recorded by receiving antenna 11. Receiving antenna 11 may be an antenna array which has a plurality of receiving elements 11a.

In case receiving antenna 11 has a plurality of receiving elements 11a, these receiving elements may be supplied to control device 13. Alternatively, receiving antenna 11 may be configured as a switched receiving antenna, in which the individual antenna elements 11a are interconnected to one another via suitable switching elements in different configurations, and for this purpose possibly only a part of the available receiving antenna elements 11a is selected for further processing.

For switched receiving antenna 11, different switching states are possible. Depending on the switching state, some antenna elements 11a, that may be far apart, may be selected in order to obtain as great as possible an aperture. Alternatively, the selection is also possible of some antenna elements 11a that are close together. Such a switching state may allow for a directional characteristic having increased unambiguousness.

The receiving signals of antenna elements 11a selected depending on the switching state are supplied to control unit 13. Control unit 13 evaluates the received signals as a function of the corresponding transmitted signal. Consequently, after successful processing by control device 13, information may be output on distance, relative speed and angular estimate. Thus, an improved angular estimation of the radar device may be achieved by controlling receiving antenna 11 and/or transmitting antenna 12.

The shown number of two transmitting antenna elements 12a and four receiving elements 11a should be understood to be merely exemplary. Other, arbitrary numbers of transmitting antenna elements 12a and receiving antenna elements 11a are also possible. The equidistant separation of the individual antenna elements 11a and 12a shown in FIG. 2 are also only exemplary. In particular, antenna arrays 11 and 12 may also be a thinned-out antenna array, in which, at least partially, greater gaps exist between the individual antenna elements. Consequently, even using a relatively small number of antenna elements, relatively large apertures are able to be synthesized. In a special specific embodiment, in addition, for example, the arrangement of the individual antenna elements on a pattern of $\lambda/2$ is possible, where $\lambda$ is the wavelength of the utilized average frequency of the radar device. Other distances for the antenna elements are also possible, however. The arrangement of the individual antenna elements may be configured in such a way that, based on the utilized switching states of the switched antenna arrays, an optimal angular estimation is achieved using as few antenna elements as possible.

FIG. 2 shows separate antenna arrays, respectively, for transmitting antenna 12 and receiving antenna 11. Furthermore, it is also possible to use a common antenna array both for emitting the transmitted signals and for receiving the reflected signals. This combination of transmitting antenna and receiving antenna in a common antenna array allows for a particularly efficient embodiment of the radar device.

Figure 3:
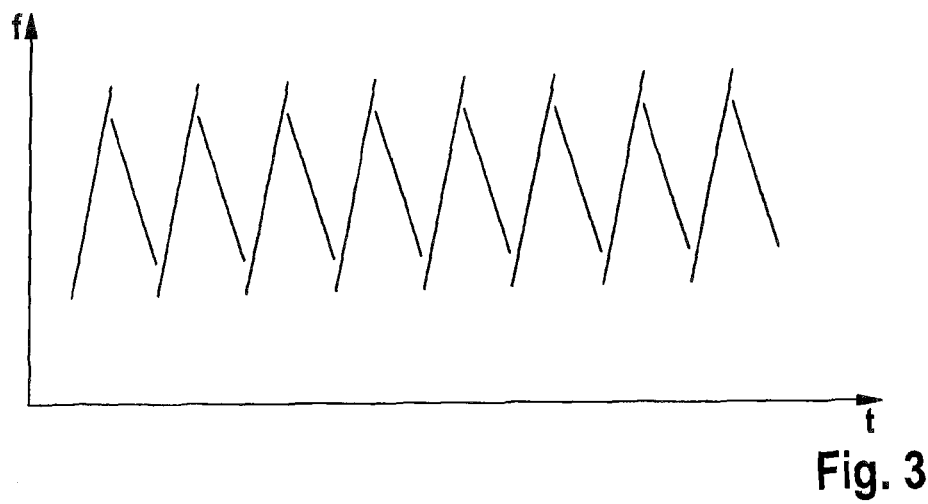
FIG. 3 shows a frequency-time diagram having a sequence of frequency-modulated radar signals according to a specific embodiment of the present invention.

In order to allow for, in addition to the angular estimation, an unambiguous distance estimation and relative speed estimation, radar signals having different modulations are emitted by transmitting antenna 12. FIG. 3 shows a frequency-time diagram having two different modulations for the transmitted signals. The two modulations, on the one hand, an up-chirp having a rising frequency and, on the other hand, a down-chirp having a frequency that drops over time, are interleaved with each other, i.e. an up-chirp and a down-chirp respectively is sent out in alternating fashion. For each of these two modulations, a separate evaluation is carried out, in order to be able to carry out an unambiguous determination of distance and relative speed from the combination of the two evaluations. Besides the two different modulations shown here, more than two different modulations are also possible, in order to improve the unambiguity further. For instance, a plurality of up-chirps and/or a plurality of down-chirps, having different slopes, may be used.

For each of the utilized modulations of the sending signal, the antenna array of transmitting antenna 12 and/or the antenna array of receiving antenna 11 are operated in a different switching state. For example, the signals having a rising frequency according to FIG. 3 may be received by an antenna array in a first switching state and the signals having a modulation having a falling frequency may be received by the antenna array in a second switching state. In this case, for emitting the transmitted signal in both modulations, the antenna array of transmitting antenna 12 may be operated in the same switching state. Alternatively, different switching states are also possible for transmitting antenna 12 for different modulations of the transmitted signal.

In a further specific embodiment, a different switching state of transmitting antenna 12 may be used for each modulation of the transmitted signal. For example, the signals having a rising frequency as in FIG. 3 may be emitted in a first switching state of transmitting antenna 12 and the signals having a dropping frequency may be emitted in a second switching state of transmitting antenna 12. In this case, receiving antenna 11 may be operated for both modulations in the same switching state. Alternatively, a different switching state of receiving antenna 11 is also possible for both modulations.

In the case of more than two different modulations for the transmitted signals, it is also possible, for some modulations of the transmitted signal, to vary the switching state of the transmitting antenna and in so doing leave the switching state of the receiving antenna unchanged, and for some further modulations of the transmitted signal to leave the switching state of the transmitting antenna the same, and to vary the switching state of the receiving antenna. In this case, each modulation of the emitted signals may correspond to an individual configuration of the switching states of the transmitting and/or the receiving antenna. However, it is fundamentally also possible that the number of modulations for the transmitted signal and the number of switching states for the transmitting and/or receiving antenna are different. In this case, however, an increased expenditure must be expected for the evaluation.

The signal processing occurs separately for each switching state of the antenna array. For the estimation of distance and relative speed, a comparison is performed and the peaks from this comparison may be associated with one another. After the distance and the relative speed of a target are known, it is possible to determine the phase offset of distance and relative speed arising from the time offset between the modulations. Thereupon the information from the two modulations may be used for the angular estimation. Thus, the approach described above yields an increase in the accuracy of the angular estimation and/or in the unambiguity of the detected targets.

According to the approach described above, a plurality of frequency ramps (up-chirps and down-chirps) are interleaved with one another and one individual configuration of the antenna switching state is selected for each of the individual frequency ramps. According to the approach of an FMCW-modulated (frequency modulated continuous wave) radar configuration, the individual frequency ramps for equal switching states of the antenna configuration are respectively always the same.

Alternative modulation methods, which are suitable for interleaving the individual frequency ramps within one another and respectively assign them to individual antenna switching states, are additionally also possible, however. For instance, a method is also particularly suitable for this purpose in which the individual ramps of the up-chirps and the down-chirps have still superposed on them a so-called slow ramp, so that, over time, the initial point and the end point of the frequencies for the ramps change. This method is known, for example, by the name multispeed frequency modulated continuous wave (MSFMCW) method.

A chirp-sequence modulation is also possible. However, in this case different ramps are appropriate having identical, or at least very similar modulation properties. Because the detection and estimation of distance and relative speed occur separately, it is again possible to determine the phase offset.

Figure 4:
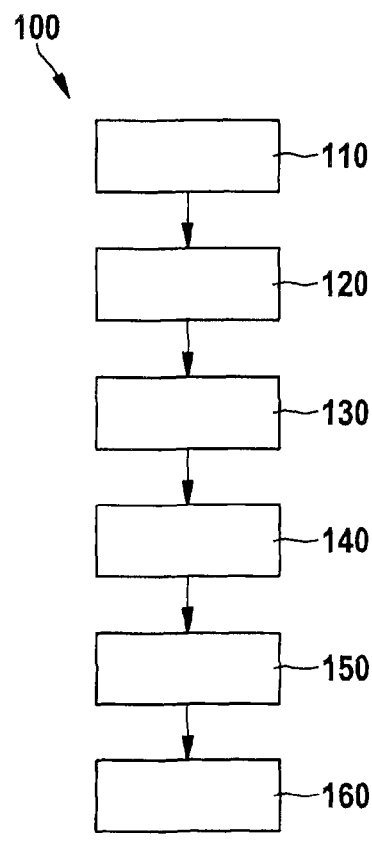
FIG. 4 shows a schematic representation of a method for operating a radar device according to a specific embodiment of the present invention.

FIG. 4 shows a schematic representation of a method for the operation of a radar device having a switched antenna array. In a first step 110, a first switching state of the antenna array is set. Thereupon, in step 120, a first radar signal having a first modulation is emitted and in step 130, a radar echo is received via the antenna array.

Furthermore, in step 140, a second switching state of the antenna array is set. Thereupon, in step 150, a second radar signal having a second modulation is emitted and in step 160, the second radar echo is received via the antenna array.

In summary, the present invention relates to a modulation concept for a radar having switched antennas. Individual switching states of the antenna array having the switched antennas are closely dovetailed with the modulation of the radar signals. In this way it is possible to use switched antennas in the time division multiplex method and thus to allow for short time periods between the switching states. Thus, this also allows for a phase evaluation across the switching states.

What is claimed is:

1. A radar device, comprising:
a switched antenna array configured to transition between a plurality of switching states; wherein:
each of the transitions includes at least one of (a) modifying which subset of a plurality of antenna elements of the antenna array is used for radar signal emission and (b) modifying which subset of the plurality of antenna elements is used for radar echo reception;
the plurality of switching states includes a first switching state in which the switched antenna array is configured to receive a first radar echo and a second switching state in which the switched antenna array is configured to receive a second radar echo;
the first radar echo is based on a first emitted radar signal having a first modulation, and the second radar echo is based on a second emitted radar signal having a second modulation; and
at least one of:
the first modulation produces the first emitted radar signal so that a frequency of the first emitted radar signal changes over time at a first slope in only one direction during the first modulation, and the second modulation produces the second emitted radar signal so that a frequency of the second emitted radar signal changes over time at a second slope in only one direction during the second modulation, the second slope differing from the first slope with respect to at least one of the respective directions of the first and second slopes and angle of inclination; and
in the first switching state, a first combination of two or more of the antenna elements of the antenna array is used for radar echo reception, and, in the second switching state, a second combination of two or more of the antenna elements of the antenna array is used for radar echo reception, at least one of the first and second combinations including at least one antenna element of the antenna array not included in the other of the first and second combinations.

2. The radar device of claim 1, wherein a different one or more of the plurality of antenna elements are used for the radar signal emission than for the radar echo reception.

3. The radar device of claim 2, wherein at least one of the transitions includes modifying which of the antenna elements is used for the radar signal emission.

4. The radar device of claim 1, wherein the first and the second emitted radar signals are emitted in an alternating manner over a predetermined time period.

5. The radar device of claim 1, wherein the first emitted radar signal and the second emitted radar signal are FMCW-modulated radar signals.

6. A motor vehicle, comprising:
a radar device, including a switched antenna array configured to transition between a plurality of switching states;
wherein:
each of the transitions includes at least one of (a) modifying which subset of a plurality of antenna elements of the antenna array is used for radar signal emission and (b) modifying which subset of the plurality of antenna elements is used for radar echo reception;

the plurality of switching states includes a first switching state in which the switched antenna array is configured to receive a first radar echo and a second switching state in which the switched antenna array is configured to receive a second radar echo;

the first radar echo is based on a first emitted radar signal having a first modulation, and the second radar echo is based on a second emitted radar signal having a second modulation; and at least one of:

the first modulation produces the first emitted radar signal so that a frequency of the first emitted radar signal changes over time at a first slope in only one direction during the first modulation, and the second modulation produces the second emitted radar signal so that a frequency of the second emitted radar signal changes over time at a second slope in only one direction during the second modulation, the second slope differing from the first slope with respect to at least one of the respective directions of the first and second slopes and angle of inclination; and in the first switching state, a first combination of two or more of the antenna elements of the antenna array is used for radar echo reception, and, in the second switching state, a second combination of two or more of the antenna elements of the antenna array is used for radar echo reception, at least one of the first and second combinations including at least one antenna element of the antenna array not included in the other of the first and second combinations.

7. A method for operating a radar device having a switched antenna array, the method comprising:

transitioning between a plurality of switching states including a first switching state and a second switching state, wherein each of the transitions includes at least one of (a) modifying which subset of a plurality of antenna elements of the antenna array is used for radar signal emission and (b) modifying which subset of the plurality of antenna elements is used for radar echo reception;

emitting a first radar signal having a first modulation while in the first switching state;

receiving a first radar echo based on the first radar signal in the first switching state of the antenna array;

emitting a second radar signal having a second modulation while in the second switching state; and receiving a second radar echo based on the second radar signal in the second switching state of the antenna array;

wherein at least one of:

the first modulation produces the first radar signal so that a frequency of the first radar signal changes over time at a first slope in only one direction during the first modulation, and the second modulation produces the second radar signal so that a frequency of the second radar signal changes over time at a second slope in only one direction during the second modulation, the second slope differing from the first slope with respect to at least one of the respective directions if the first and second slopes and angle of inclination; and in the first switching state, a first combination of two or more of the antenna elements of the antenna array is used for radar echo reception, and, in the second switching state, a second combination of two or more of the antenna elements of the antenna array is used for radar echo reception, at least one of the first and second combinations including at least one antenna element of the antenna array not included in the other of the first and second combinations.

8. The radar device of claim 1, wherein the first modulation produces the first emitted radar signal so that the frequency of the first emitted radar signal changes over time at the first slope in only one direction during the first modulation and the second modulation produces the second emitted radar signal so that the frequency of the second emitted radar signal changes over time at the second slope in only one direction during the second modulation, the second slope differing from the first slope with respect to the at least one of the respective directions of the first and second slopes and angle of inclination.

9. The radar device of claim 1, wherein, in the first switching state, the first combination of two or more of the antenna elements of the antenna array is used for radar echo reception, and, in the second switching state, the second combination of two or more of the antenna elements of the antenna array is used for radar echo reception, the at least one of the first and second combinations including the at least one antenna element of the antenna array not included in the other of the first and second combinations.

10. The radar device of claim 9, wherein the first modulation produces the first emitted radar signal so that the frequency of the first emitted radar signal changes over time at the first slope in only one direction during the first modulation and the second modulation produces the second emitted radar signal so that the frequency of the second emitted radar signal changes over time at the second slope in only one direction during the second modulation, the second slope differing from the first slope with respect to the at least one of the respective directions of the first and second slopes and angle of inclination.

11. A radar system, comprising:

a processor; and a switched antenna that includes an array of a plurality of antenna elements;

wherein:

the processor is configured to:

control the switched antenna to emit radar signals that include a first radar signal with a first modulation that changes a frequency of the first signal over time of the emission of the first radar signal at a first slope and a second radar signal with a second modulation that changes a frequency of the second signal over time of the emission of the second radar signal at a second slope, the second slope differing from the first slope with respect to at least one of direction and angle of inclination;

based on the respective modulations used for the emissions of the first and second radar signals, select a first subset of the antenna elements for the first modulation and select a second subset of the antenna elements for the second modulation, at least one of the antenna elements that is included in the second subset not being included in the first subset; and based on the selections, switch between:

a first state set whenever the first modulation is used for emission of the first radar signal in which first state the processor obtains from the first subset of the antenna elements, and processes, an echo of the first emitted signal, the processor not using for the processing of the echo of the first emitted signal any signals from the at least one of the antenna elements that is included in the second subset and not included in the first subset; and a second state set whenever the second modulation is used for emission of the second radar signal in which second state the processor obtains from the second subset of the antenna elements, and processes, an echo of the second emitted signal, the processor using for the processing of the echo of the second emitted signal signals of all of the antenna elements of the second subset;

at least one of:
each of the first and second subsets includes a respective combination of two or more of the antenna elements; and
the switching between the first and second states includes transitions into and out of the first state and transitions into and out of the second state, each transition including at least one of (a) modifying which subset of the plurality of antenna elements is used for radar signal emission and (b) modifying which subset of the plurality of antenna elements is used for radar echo reception, the change in frequency in the first state being in only one direction, and the change in frequency in the second state being in in only one direction.

12. The radar device of claim 1, wherein the plurality of switching states includes a third switching state in which the switched antenna array is configured to receive a third radar echo based on a third emitted radar signal having a third modulation that produces the third emitted radar signal so that, during the third modulation, a frequency of the third emitted radar signal changes over time at a third that is different than each of the first and second slopes, a different combination of the plurality of antenna elements being used for the emission of the third emitted radar signal and the reception of the third radar echo than (a) the plurality of antenna elements used for the emission of the first emitted radar signal and the reception of the first radar echo and (b) the plurality of antenna elements used for the emission of the second emitted radar signal and the reception of the second radar echo.

13. The radar device of claim 9, wherein a spatial distance spanning across the first combination of two or more of the antenna elements is greater than a spatial distance spanning across the second combination of two or more of the antenna elements.

14. The radar device of claim 1, wherein a different subset of the antenna elements is used for the emission of the first emitted radar signal than is used for the emission of the second emitted radar signal.

15. The radar device of claim 1, wherein:
respective subsets of the antenna elements used for radar signal emission differ between a first pair of the switching states;
a same subset of the antenna elements is used for radar echo reception in both of the first pair of the switching states;
respective subsets of the antenna elements used for radar echo reception differ between a second pair of the switching states; and
a same subset of the antenna elements is used for radar signal emission in both of the second pair of the switching states.

16. The radar device of claim 1, wherein the transitions include changing between different respective interconnections of the antenna elements.

17. The radar device of claim 9, wherein the respective two or more of the antenna elements of each of the first and second combinations includes less than all of the plurality of antenna elements configured and arranged for radar echo reception.

\* \* \* \* \*